(12) United States Patent
Goel et al.

(10) Patent No.: US 10,586,473 B2
(45) Date of Patent: Mar. 10, 2020

(54) DISPLAY DESIGNS AND AUXILIARY PROMOTIONAL MECHANISMS FOR ELECTRONIC LABELS

(71) Applicant: Altierre Corporation, San Jose, CA (US)

(72) Inventors: Anurag Goel, Pleasanton, CA (US); Sunit Saxena, Monte Sereno, CA (US); Shan Nantha Kumar, San Ramon, CA (US)

(73) Assignee: ALTIERRE CORPORATION, San Jose, CA (US)

( * ) Notice: Subject to any disclaimer, the term of this patent is extended or adjusted under 35 U.S.C. 154(b) by 0 days.

(21) Appl. No.: 15/011,468

(22) Filed: Jan. 29, 2016

(65) Prior Publication Data
US 2016/0148544 A1     May 26, 2016

Related U.S. Application Data

(63) Continuation of application No. 11/521,899, filed on Sep. 15, 2006, now abandoned, which is a continuation-in-part of application No. 11/504,262, filed on Aug. 14, 2006, now Pat. No. 7,600,681, and a continuation-in-part of application No. 11/019,916, filed on Dec. 20, 2004, now Pat. No. 7,413,121.

(60) Provisional application No. 60/717,956, filed on Sep. 16, 2005, provisional application No. 60/737,288, filed on Nov. 16, 2005.

(51) Int. Cl.
| | |
|---|---|
| G09F 3/20 | (2006.01) |
| G06Q 30/06 | (2012.01) |
| G09F 13/22 | (2006.01) |

(52) U.S. Cl.
CPC ............. *G09F 3/208* (2013.01); *G06Q 30/06* (2013.01); *G09F 3/204* (2013.01); *G09F 2013/222* (2013.01)

(58) Field of Classification Search
CPC ......... G06Q 30/06; G09F 3/208; G09F 3/204; G09F 2013/222
USPC ......... 345/1.1–7, 204; 340/5.91, 5.92, 572.1, 340/815.45; 235/383
See application file for complete search history.

(56) References Cited

U.S. PATENT DOCUMENTS

| | | | |
|---|---|---|---|
| 4,303,910 A | 12/1981 | McCann | |
| 4,740,779 A | 4/1988 | Cleary et al. | |
| 4,888,709 A | 12/1989 | Revesz et al. | |
| 4,896,319 A | 1/1990 | Lidinsky et al. | |
| 5,771,005 A * | 6/1998 | Goodwin, III | G06F 3/147 235/383 |
| 5,880,449 A | 3/1999 | Teicher et al. | |

(Continued)

FOREIGN PATENT DOCUMENTS

| | | |
|---|---|---|
| EP | 0790549 | 8/1997 |
| EP | 0837 439 | 4/1998 |

OTHER PUBLICATIONS

EP 06803780 Supplemental European Search Report dated Jul. 10, 2009 (6 pages).

*Primary Examiner* — Dmitriy Bolotin
(74) *Attorney, Agent, or Firm* — DLA Piper LLP (US)

(57) ABSTRACT

In one embodiment of the present invention, a real-time delivery of Point of Purchase (POP) messaging at various locations around a retail store is included within aisles, end-of-aisles, shelf edge, departments, check-out stands, on shopping carts and mobile personal devices carried by individual customers.

10 Claims, 11 Drawing Sheets

(56) References Cited

U.S. PATENT DOCUMENTS

| | | | |
|---|---|---|---|
| 6,068,383 A * | 5/2000 | Robertson | F21V 3/04 |
| | | | 250/461.1 |
| 6,367,752 B1 * | 4/2002 | Forsythe | G09F 3/204 |
| | | | 248/220.21 |
| 6,481,870 B2 | 11/2002 | Son | |
| 6,621,407 B1 * | 9/2003 | Goodwin, III | G06Q 30/02 |
| | | | 340/5.91 |
| 6,897,763 B2 | 5/2005 | Schulmerich et al. | |
| 6,914,648 B2 | 7/2005 | Niiyama et al. | |
| 7,119,759 B2 | 10/2006 | Zehner et al. | |
| 2001/0045893 A1 | 11/2001 | Swartzel et al. | |
| 2002/0042741 A1 * | 4/2002 | Wilson, III | G06Q 30/0241 |
| | | | 705/14.4 |
| 2002/0109603 A1 | 8/2002 | Otto | |
| 2006/0273162 A1 * | 12/2006 | Andersson | G06F 3/147 |
| | | | 235/383 |
| 2008/0079538 A1 * | 4/2008 | Davis | G06Q 30/0226 |
| | | | 340/5.91 |

\* cited by examiner

DISPLAY DESIGNS AND AUXILIARY PROMOTIONAL MECHANISMS FOR ELECTRONIC LABELS

This application is continuation of and claims priority under 35 USC 120 and 35 USC 121 to U.S. patent application Ser. No. 11/521,899 filed on Sep. 15, 2006, entitled "Display Designs and Auxiliary Promotional Mechanisms for Electronic Labels" which application in turn claims priority to previously-filed U.S. Provisional Patent Application 60/717,956, entitled "Remote Programmable Bib Tag Units" and filed on Sep. 16, 2005 and further claims priority to previously-filed U.S. Provisional Patent Application No. 60/737,288, entitled "Programmable Messaging Systems for Customer Communications" and filed on Nov. 15, 2005, and further is a continuation-in-part of U.S. patent application Ser. No. 11/504,262 filed on Aug. 14, 2006 and entitled "Low Power Wireless Display Tag Systems and Method" and a continuation-in-part of U.S. patent application Ser. No. 11/019,916, filed on Dec. 20, 2004, entitled "Multiuser Wireless Display Tag Infrastructure and Methods" the disclosures of which are incorporated herein as though set forth in full.

BACKGROUND

Field

The present invention relates generally to the field of promotional labeling in retail outlets, such as grocery stores, and in particular to electronic labeling to enhance noticeability thereof.

Description of the Prior Art

Retail outlets, such as grocery stores, clearly have great interest for increasing their sales. In so doing, there is great incentive to assist potential customers visiting their store in easing their shopping experience. For example, signs or directories directing the customers to various areas are employed. Price labels promoting items on sale or otherwise are employed.

Figure 1:
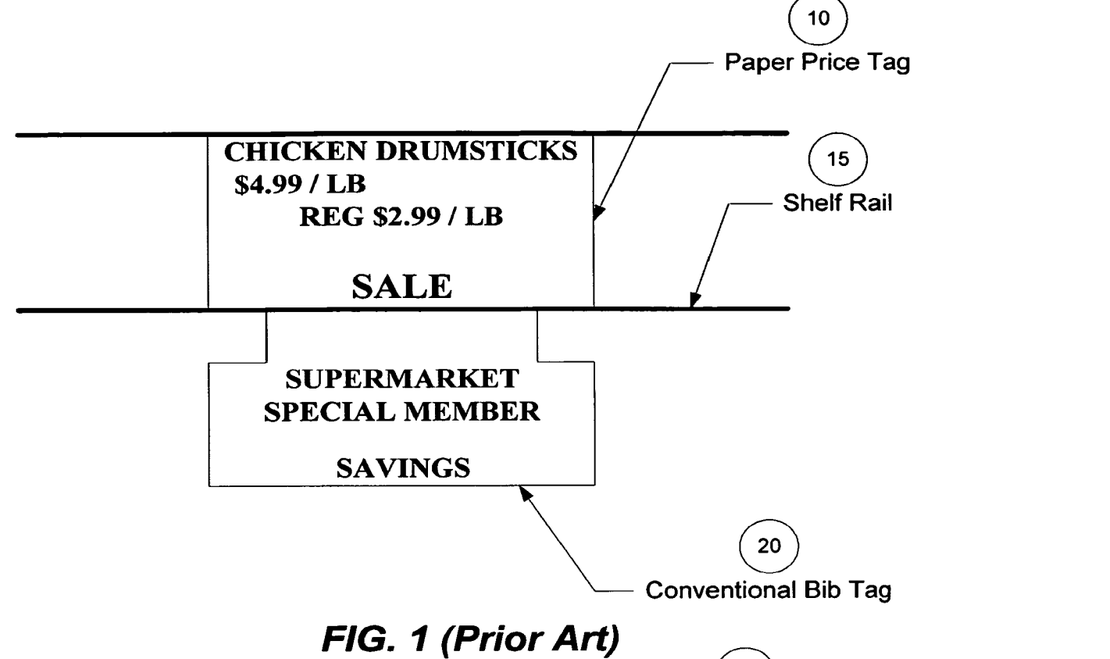
FIG. 1 shows a prior art example of the use of conventional paper Bib Tags 20 for promotional activity in conjunction with price labels at the shelf edge 15.

Referring to FIG. 1, in addition to a price label 10 at the shelf edge 15, retail stores typically like to hang a flexible sign 20 under or near the price label to draw the customers' attention to promotions and special sale pricing on items. Typically printed on paper or flexible plastic, these generic signs are known in the retail industry as "Bib Tags" 20.

As a customer enters an aisle, the Bib Tags are used to draw the customer's attention to themselves, location or a product—thus announcing the relevant message on the items that they represent. However, most items in a retail store nowadays carry Bib Tags of one kind or another—thus losing their differentiability and impact.

Moreover, paper or plastic Bib Tags being passive display elements, do not "call out" to the customers at a distance any more than the paper price labels.

Figure 2:
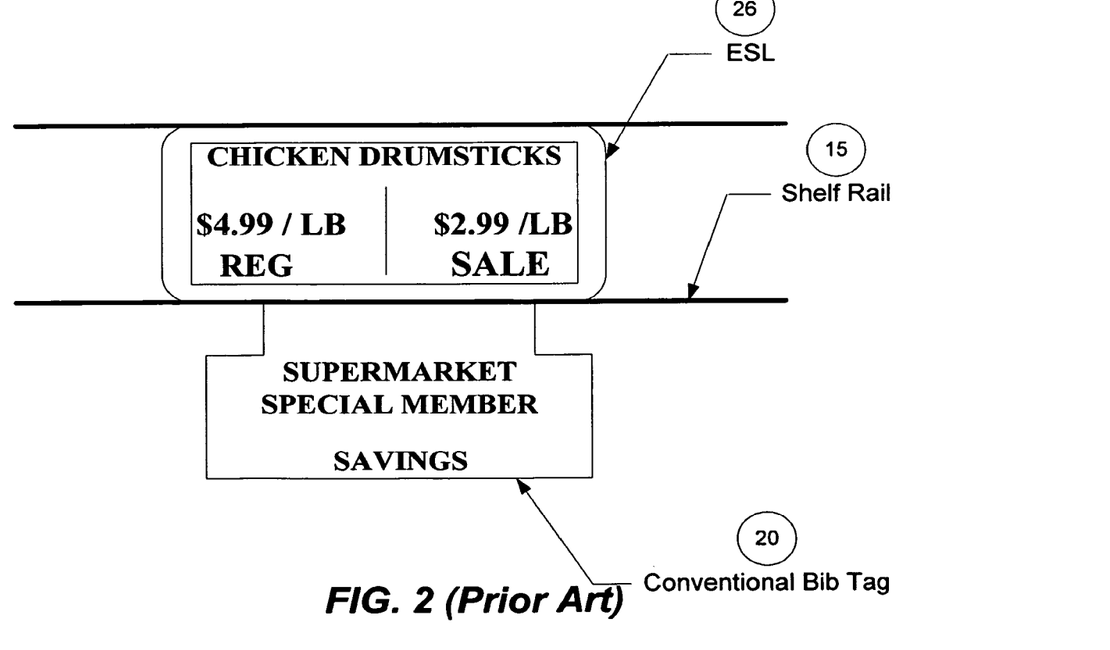
FIG. 2 shows the pairing of an ESL 25 with a conventional Bib Tag 20.

Referring now to FIG. 2, we see that conventional paper or flexible plastic Bib Tags 20 are still passive display elements when deployed with Electronic Shelf Labels 25, and do not improve the differentiability and impact of the message that the Bib Tags are supposed to deliver.

Alternatively, an ESL may be also provided with programmable Bib Tag elements to flag special pricing and promotions being offered on the ESL screen. Thus, the need arises for replacing conventional Bib Tags with electronic Bib Tags conveying a message to the potential customer thereby increasing the likelihood of the customer's attention to the Bib Tag.

Currently, the Retail Industry has to go through great lengths to advertise promotions via the print media. This is a costly process with built in time lag between promotional decision and execution and the inability to influence customers' purchase decisions at the Point of Purchase (POP).

Figure 3:
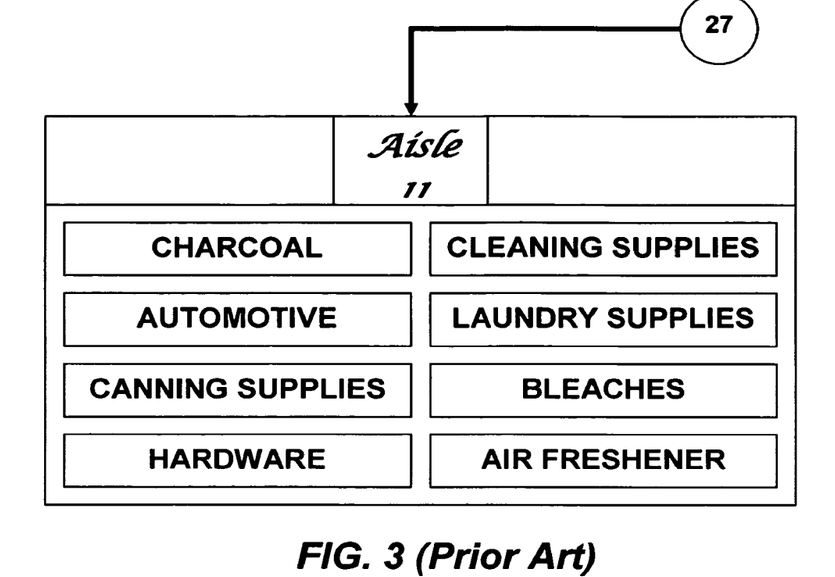
FIG. 3 shows a prior art example of an AISLE DIRECTORY 27.

A variety of promotional solutions at POP have been proposed that lack real-time associativity with the sale items on the shelves. This results in customers being bombarded with promotional messages in the aisle for items that may not be in the particular aisle or not even in the store. Thus, any attempt at influencing the customers' buying decision at the POP is lost. Referring now to FIG. 3, we see the current practice in retail stores of having an "Aisle Directory" 27 in each aisle or half-aisle. These Aisle Directories are placed either near the entrance to the aisle, or halfway into the aisle, hanging from the ceiling. These Aisle Directories direct the customers to the general categories of goods being sold in that particular aisle. Examples of general categories of goods are: "Cereal," "Hair Care," "Cough & Cold," etc. These Aisle Directories present static category messages to the customers and do not draw their attention to specific items in the aisle or a special deal in that particular aisle on a particular time or day.

Therefore, the need arises for electronic aisle directories to allow for dynamic messaging directed to potential customers of a retail outlet and to allow for more specific information to be conveyed to the customers.

SUMMARY OF THE INVENTION

Briefly, embodiments of the present invention addresses issues of lack of differentiability and lack of impact associated with prior art paper or plastic sheet Bib Tags.

Other embodiments of the present invention address the issue of real-time delivery of POP messaging at various locations around the store including within aisles, end-of-aisles, shelf edge, departments, check-out stands, on shopping carts and mobile personal devices carried by individual customers.

Still other embodiments of the present invention address the issue of associativity between POP messaging and item location in the store.

These and other objects and advantages of the present invention will become apparent to those skilled in the art after having read the following detailed description of the preferred embodiments illustrated in the several figures of the drawing.

DETAILED DESCRIPTION OF ONE OR MORE EMBODIMENTS

Figure 4:
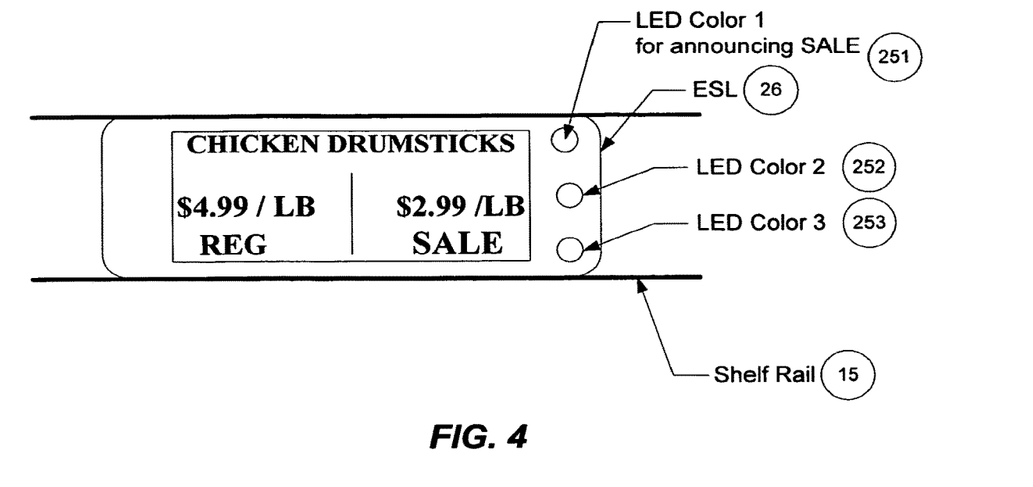
FIG. 4 shows an embodiment of the PBT 251, 252, 253 where it is integrated within the body of an ESL 25.

Referring to FIG. 4, a remotely programmable ESL 26 is shown, in accordance with an embodiment of the present invention. As will become apparent shortly, the ESL 26 of the embodiments of the present invention allow visibility of promotional information regarding an item for sale from a greater distance than that allowed currently. Furthermore, messages can be dynamically shown to customers, at different times and dates and in real-time. In this manner, an in-store messaging via electronic display is effectuated. Further information on ESLs is provided in U.S. patent application Ser. No. 11/504,262 filed on Aug. 14, 2006 and entitled "Low Power Wireless Display Tag Systems and Method", the disclosure of which is incorporated herein by reference as through set forth in full.

In the embodiment of FIG. 4, a plastic bib tag (PBT) can be an integral part of the ESL 26 body by virtue of several LEDs 251, 252, 253 being integrated on the ESL 26 face. For example, placement of one or more Light Emitting Devices (LEDs) of different colors 251, 252, 253 may be located on the face of an ESL 26. These LEDs are driven to an ON or OFF or FLASHING state by the logic of the ESL circuitry. The ESL mounted LEDs are either powered by the ESL battery, additional battery or an ESL mounted solar cell. Each color LED would have significance either to the customer or the store operations personnel. Examples of information conveyed by the state and/or color of the LEDs includes but is not limited to the regular and discounted prices of an item that is likely to be located in close proximity to the ESL and the like.

A current need in the retail industry is to replace paper price labels at shelf edges with remotely programmable Electronic Shelf Labels (ESLs). This gives the retailer a centralized way of affecting product pricing and other product information at the shelf edge. The retailer still needs an auxiliary device to the ESL to attract the customers' attention to promotions and any auxiliary messages. For this purpose, the retailer may again use conventional Bib Tags in conjunction with or separate from ESL deployment.

The ESL 26, in an exemplary application, is placed at the shelf-edge or other locations near the item(s) associated therewith, such as chicken drumsticks, as shown in FIG. 4. The LEDs 251-253 are much more likely to draw attention from a potential customer to the associated item. Moreover, the LEDs 251-253 alert the customer while the customer is located farther away therefrom than conventional labels.

Figure 5:
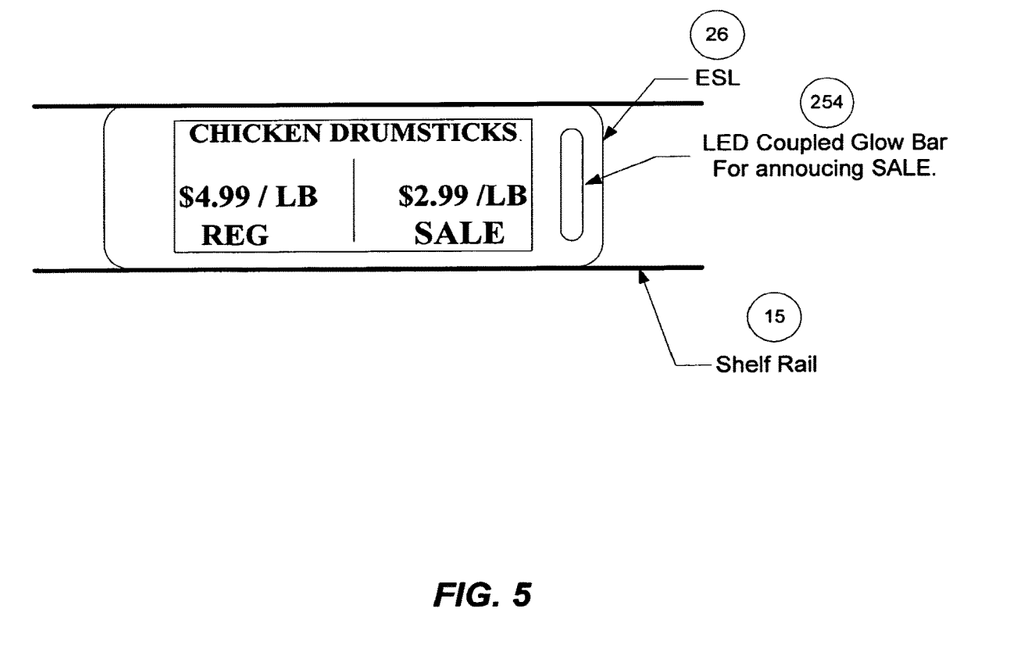
FIG. 5 shows an embodiment of the PBT 254 where an LED is coupled to a fluorescent plastic element mounted on the face of the ESL 25.

Referring to FIG. 5, in accordance with another embodiment of the present invention, the PBT can be an integral part of the ESL 26 body by virtue of an LED Couple Glow Bar 254 being integrated on the ESL 26 face. In the embodiment of FIG. 5, placement of a "glow-bar" or "glow-band", which may include one or more LEDs 254, is within the body of the ESL 26 such that it is coupled to a fluorescent element mounted on the ESL facing such that the fluorescent element acts as an enhancement for the LED coupled light source. This light coupling causes the fluorescent element to fluoresce in its characteristic wavelength band, thus extending the effect of the LED. The LED is again driven to an ON or OFF or FLASHING state by the ESL circuitry. The ESL mounted LED 254 is either powered by the ESL battery, additional battery, ESL mounted solar cell, or other power source.

Figure 6:
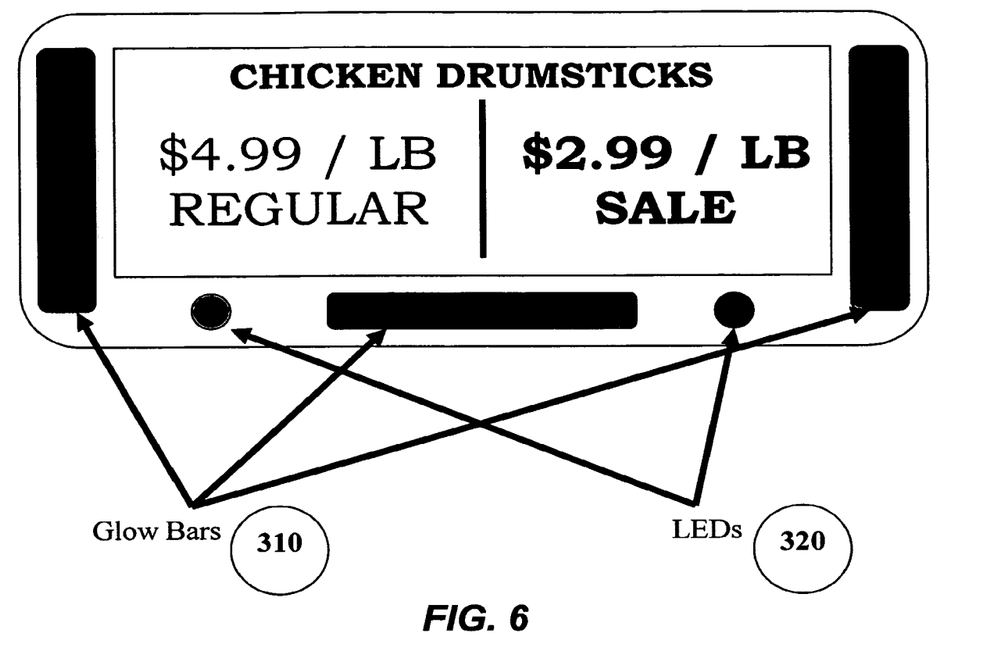
FIG. 6 shows another embodiment of the present invention prescribing placement of "glow-bars" or "glow-bands" 310.

Referring now to FIG. 6, another embodiment of the present invention prescribes placement of "glow-bars" or "glow-bands" 310 which are other active elements that can be driven to an ON or OFF or FLASHING state by the logic of the ESL circuitry. Note that this active element is separate from the main display area of the ESL and can be mounted in different locations within the ESL body. The "glow-bars" may be LCD or LED based and maybe colored.

Referring again to FIG. 6, the LEDs 320 and the "glow-bars" 310 may be combined into a single embodiment of the ESL where each of them can be controlled independently by the ESL logic to flag a different promotional activity. In addition, any of these active-elements can also be assigned to message store-operations personnel.

Figure 7:
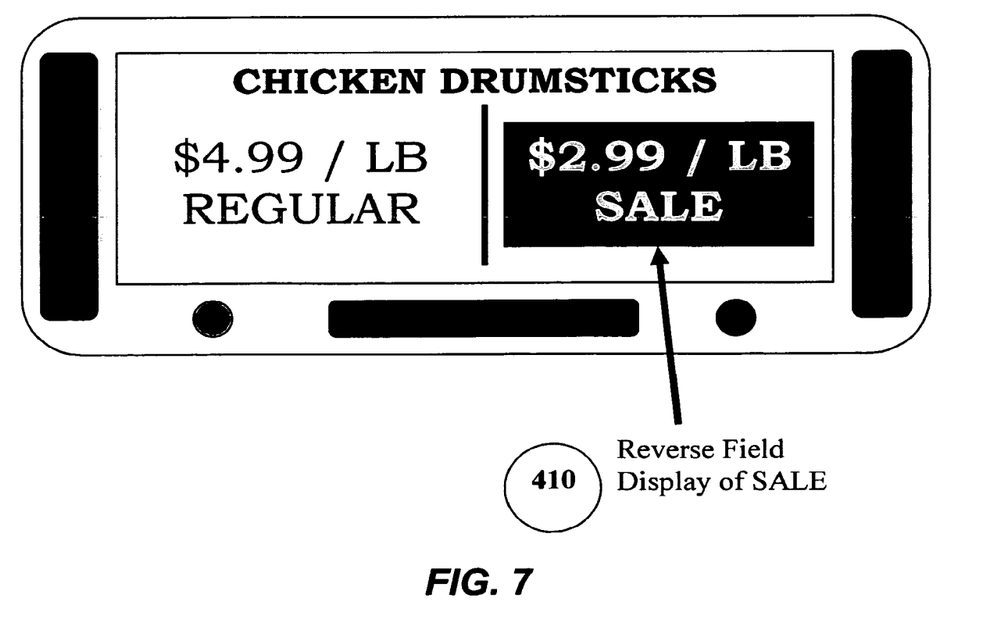
FIG. 7 shows a screen display element of an ESL showing "REGULAR" and "SALE" pricing with the "SALE" pricing area of the screen being accentuated with reverse field 410 in accordance with another embodiment of the present invention.

Referring now to FIG. 7, a screen display element of an ESL showing "REGULAR" and "SALE" pricing is shown in accordance with an embodiment of the present invention. The embodiment of FIG. 7 prescribes that the "SALE" pricing area of the screen be accentuated with reverse field 410 as shown in FIG. 7. In addition, a particular area of the screen may be designated to be always reverse field if a "SALE" price appears there. For example, the right-half of the screen may be designated as the reverse-field area if a "SALE" price is to be displayed there. In this manner, the shoppers are "trained" to the visual cue that if they see reverse-field on the right-half of the screen, then the item must be on sale. It should be noted that the reverse-field accenting of "SALE" pricing can be done in conjunction with the LED/glow-bar promotional devices.

Figure 8:
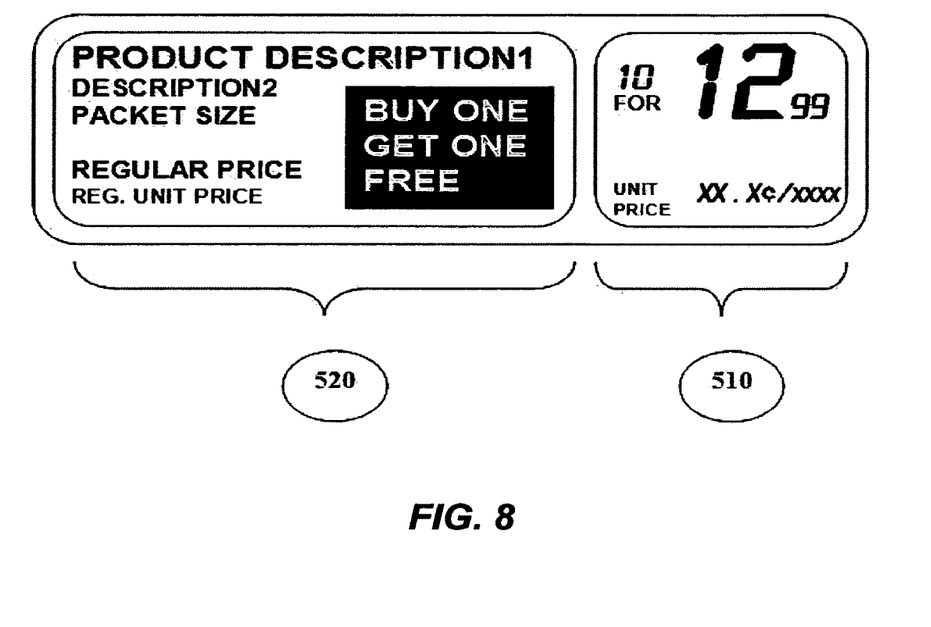
FIG. 8 illustrates how an ESL screen element may be designed to be a hybrid of a dot-matrix and segmented display elements, in accordance with another embodiment of the present invention.

Referring now to FIG. 8, an illustrative embodiment is shown of how an ESL screen element may be designed to be a hybrid of a dot-matrix and segmented display elements. As shown, the right-side 510 of the ESL display element is made up of a segmented display element. The left-side 520 is regular dot-matrix display element.

Referring again to FIG. 8, the segmented display element 510 can be designed to display information that is always displayed or the information that shoppers most often look for. The segments in the segmented display element 510 can be made as large and bold as necessary to highlight the information presented in this segment. As shown in this embodiment 510, this information can be the SALE PRICE and the UNIT PRICE per UNIT OF SALE. Each of the cell or character in the segmented display element 510 is 13 segments or greater and can therefore display any numeral or alphabet, although any number of segments is anticipated. Thus, the segmented display element 510 can show any data variation for the data types this segment is designed for.

Figure 9:
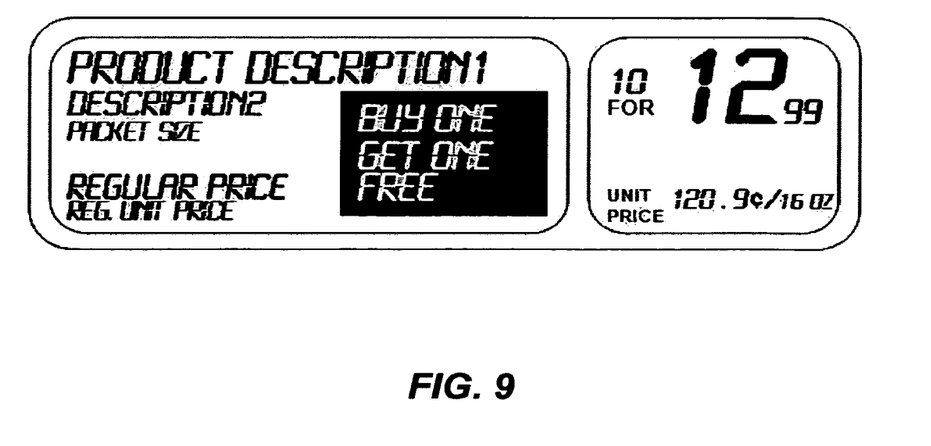
FIG. 9 shows that even the dot-matrix part 520 of the display shown in FIG. 8 can also be made into a segmented display.

Referring again to FIG. 8, the dot-matrix display element 520 can by virtue of its graphical layout being fully programmable, display any kind of bit-mapped information. FIG. 8 shows just one illustrative example of how a dot-matrix display element 520 can be partitioned to show different kinds of information useful to the shoppers. Referring now to FIG. 9, there is shown, the dot-matrix part 520 of the display shown in FIG. 8 having a segmented display as well. If the content for the layout on the left side in this configuration is to made programmable, then the left part of the display can be filled with 16 segment display cells that can display any desired character.

In the embodiments of FIGS. 4 and 5, the LEDs/glow-bar mount within the main body of the ESL and share the same or additional power source to the ESL. If it is desirable for the LEDs/glow-bar to be physically separate but electrically connected to the ESL, another embodiment, shown in FIG. 10, is prescribed.

Figure 10:
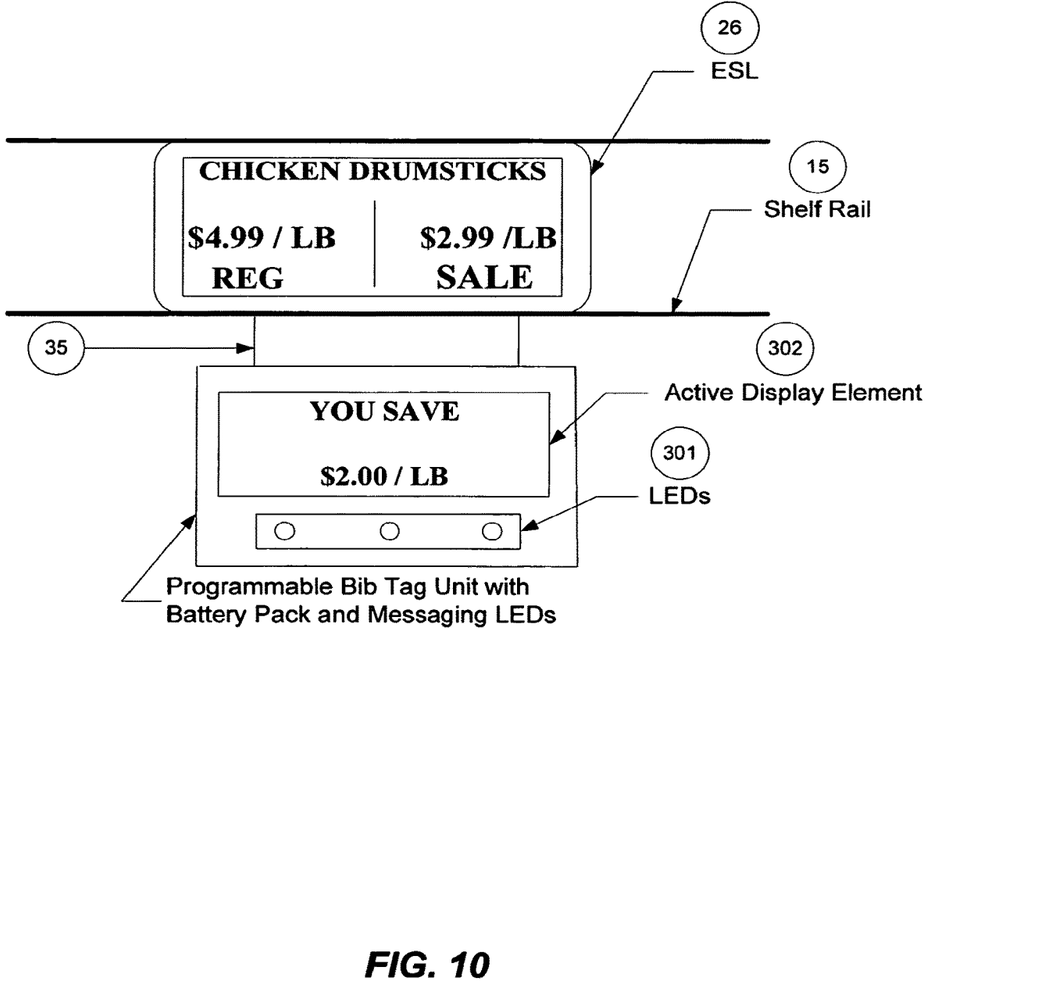
FIG. 10 shows the PBT 30 as an autonomous unit that hangs from the ESL 25 via a flexible data connector 35 and includes an active display element 302.

Referring still to FIG. 10, the ESL 26 is shown coupled to a Programmable Bib Tag (PB) 30, which is shown to include an active display element 302 and LEDs (and/or glow-bar), in accordance with an embodiment of the present invention. The Programmable Bib Tag (PBT) 30 can be unobtrusively paired with an ESL 26 and hang below it via a flexible connector 35 that connects to an output port on the ESL 25. Via the flexible connector 35, under a computer control, the ESL 26 sends signals to the PBT 30 to turn ON, OFF or FLASH a particular LED on the PBT. Once the PBT receives the signal, it latches it and sets the state of the specified LED appropriately. As relative to the ESL, the LEDs 301 of the PBT are used to convey information regarding the item being promoted for sale, such as special pricing therefor.

Referring again to FIG. 10, the PBT body 30 may include the integrated flexible connector 35 that it uses to connect to an ESL, a desired number of LEDs 301, an Active Display Element 302, a battery pack and/or a solar cell as power-source and a circuit element for controlling the functioning of the PBT.

In the embodiment of FIG. 10, the LEDs/glow-bar 301 are mounted in a separate housing that also contains independent power sources for powering the LEDs/glow-bar. These power sources can include batteries and/or solar cells and/or other power sources. This embodiment may also include a passive or an active display element 302. It may also include driving circuitry for dynamic or static programmable customer messaging in conjunction with the LEDs/glow-bar. This embodiment is collectively referred to herein as the PBT 30. The PBT connects to an output port on the ESL 26 via a flexible connector 35 such that the PBT can hang below the ESL just like a conventional paper/plastic passive Bib Tag element. The ESL provides signals to the PBT, via the PBT connector 35 attached to the ESL output port, that specify the behavior of the PBT mounted LEDs/glow-bar. This behavior includes ON, OFF and FLASHING states—as well as displaying any customer facing messages that may have been downloaded via the ESL. Alternatively, this control and messaging could be wirelessly (radio, infra-red, capacitive, inductive, magnetic, or other forms known to those skilled in the art) provided directly to the PBT. These behaviors and their timings are controlled by the ESL or in the PBT itself. The active display element 302 is another manner of displaying information regarding an item being promoted. It uses active displays, as known in the art, for such purpose.

Figure 11:
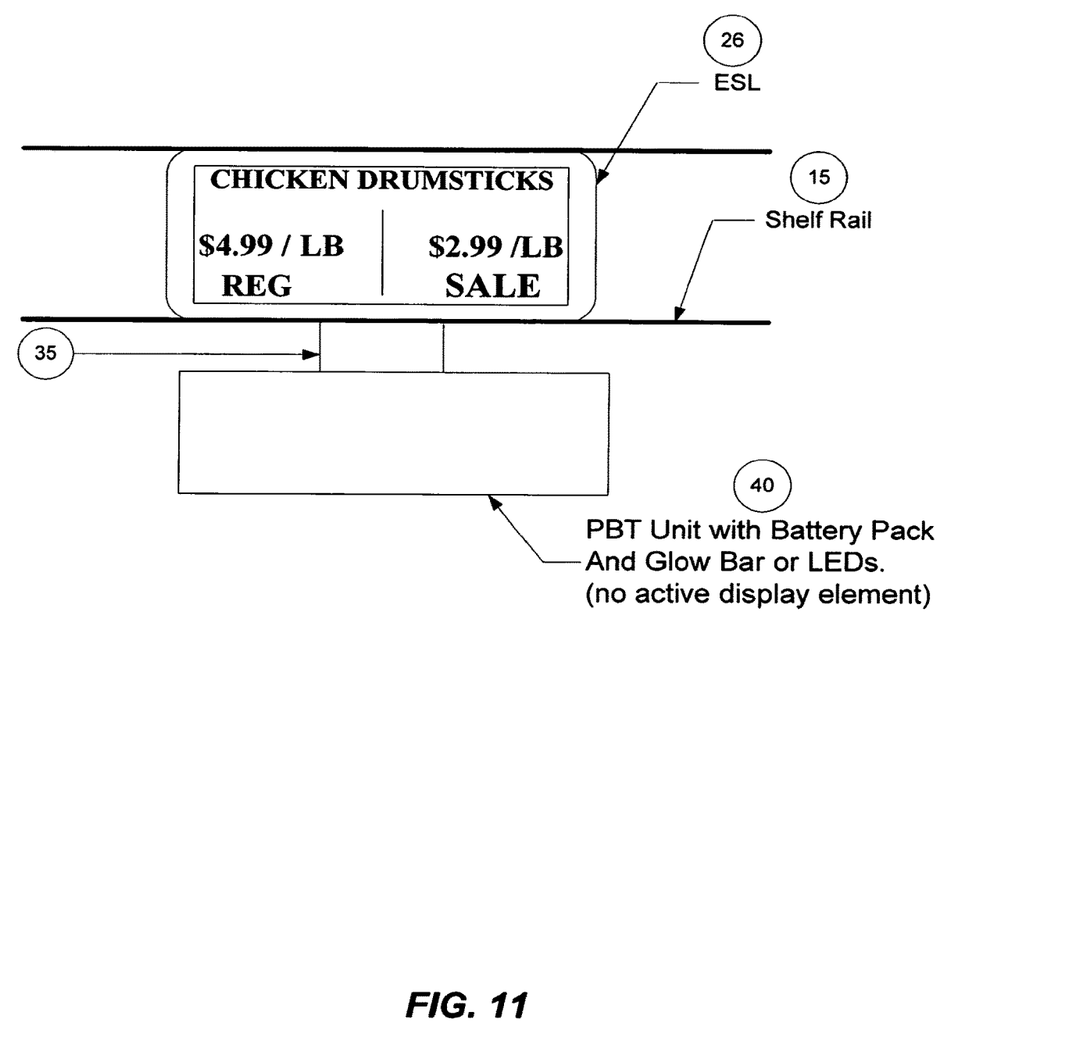
FIG. 11 shows the PBT 40 as an autonomous unit that hangs from the ESL via a flexible data connector 35 but does not include an active display element.

Referring to FIG. 11, the PBT Unit 40 is essentially the same as in FIG. 10 30, but without any Active Display Element. In the embodiment of FIG. 11, the PBT does not include the dynamic display element. In this embodiment, the PBT 40 is minimally visible and catches attention only when the LEDs or the glow bars mounted within are activated. This embodiment of the PBT could be considered to be the least distracting when not being used.

Figure 12:
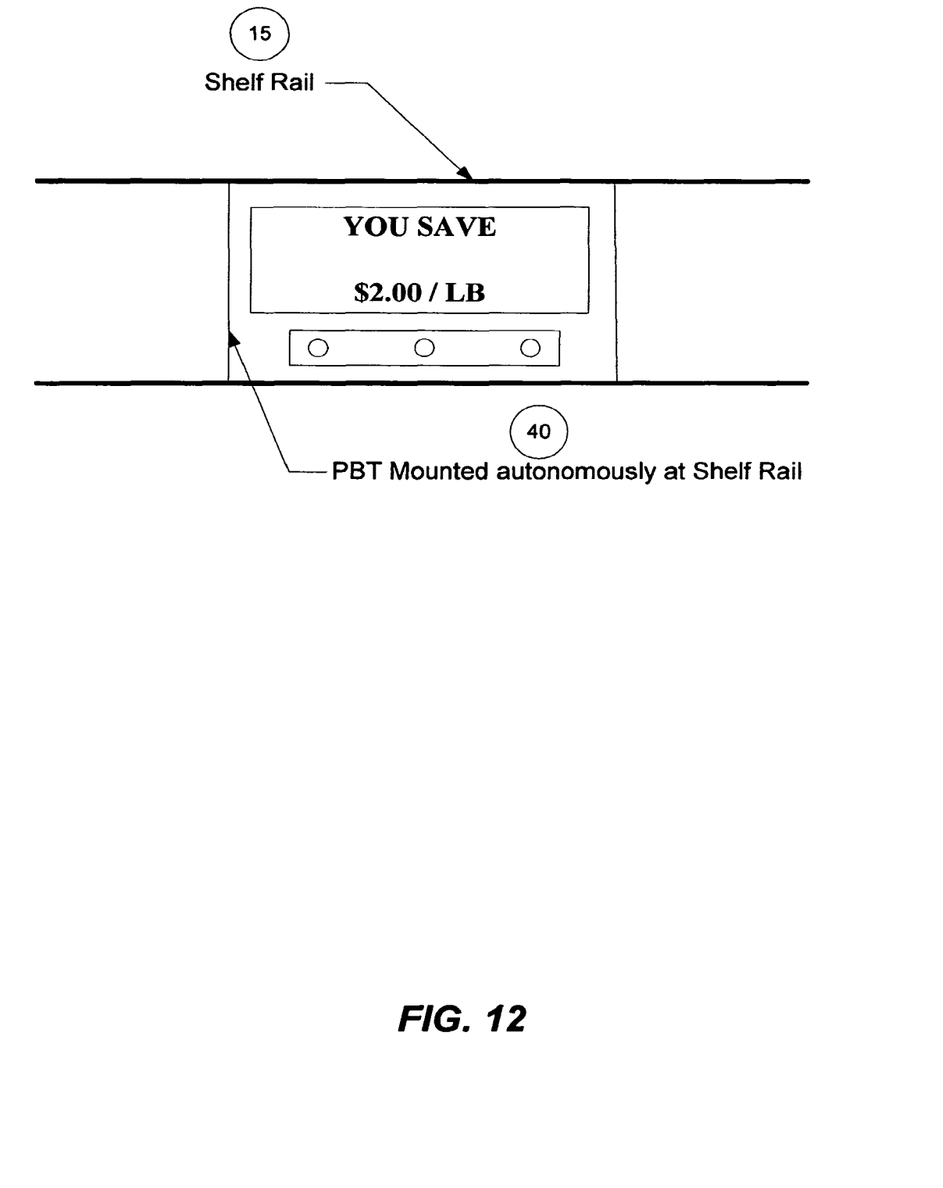
FIG. 12 shows the PBT 40 as an autonomous unit where the PBT unit is autonomously mounted at the Shelf Rail 15 and does not require pairing up with an ESL. In this embodiment, the PBT is directly remote programmable via a controller.

Referring to FIG. 12, the PBT Unit 40 is essentially the same as in FIG. 10 30, but the PBT unit is autonomously mounted at the Shelf Rail 15 and does not require pairing up with an ESL. In the embodiment of FIG. 12, the PBT is directly and remotely programmable via a controller.

As to which of the LEDs, either within the body of the ESL or on the LED Bib Tag (PBT) that plugs into the logic of the ESL, turn on, this is controlled by the controller of the ESL.

In the embodiments of FIGS. 10 and 12, the LEDs may be pulse powered at a time for any duration less than $\frac{1}{30}$th of a second and still be visible to the human eye. This is possibly due to the characteristic of the retina which retains the images even when the image has been removed from the field of view. This is significant in that current attempts at flashing LEDs have supplied power pulses for periods of the order of $\frac{1}{30}$th of a second or more—which has resulted in the batteries powering the LEDs to run out over shorter time frames. The LEDs in the described embodiments of the present intervention have remained visible even when driven by pulses for durations of the order of milliseconds. This key innovation results in a significant power savings in the driving power source.

The PBT 30 has several advantages, enumerated below, among others:

One: When PBTs are deployed with each ESL, they can easily be differentiated depending on their OFF or ON/FLASHING states. Thus, an ON or FLASHING PBT draws attention to itself, while an OFF PBT does not draw attention to itself.

Two: ON or FLASHING PBTs are visible even from the end of the store aisle and invite customers to enter the aisle and look at the details of the message as displayed on the ESL or product or other display in its proximity. This differentiates the PBTs from the passive paper/plastic Bib Tags.

Three: A set of colors can be consistently "assigned" to customers whilst other colors can be assigned for store operations that can be easily ignored by customers. For example, bright-red LEDs can be "assigned" exclusively for customer messaging while other colors such as yellow and green can be reserved for store operations.

Four: The PBT being an autonomous unit in the sense that it carries its own power source, can be easily detached from the ESL and replaced by a new one if and when its power source gets depleted. Since the PBTs can be made relatively much cheaper compared to ESLs, this would save the retailer significant amount of money when using ESL and PBT solutions concurrently in their stores.

Five: The PBT being powered autonomously via its own self-contained power-source, it does not create a power drain on the power-source of the ESL. This results in longevity of the ESL at the shelf edge.

Six: The LEDs in the various embodiments of the present invention can be pulse-powered by pulses of durations of the order of milliseconds and still remain visible to the human eye. This results in a significant power savings in the driving power source.

Seven: The use of PBT allows the retail store operator to maintain the current business process of using Bib Tags for promotional activity in conjunction with price labels at the shelf edge.

In the embodiments to follow, the issue of real-time delivery of POP messaging at various locations around the store including within aisles, end-of-aisles, shelf edge, departments, check-out stands, on shopping carts and mobile personal devices carried by individual customers, are addressed. For further information regarding POP, the reader is referred to U.S. patent application Ser. No. 11/019,916, filed on Dec. 20, 2004, entitled "Multiuser Wireless Display Tag Infrastructure and Methods", the disclosure of which is incorporated by reference as though set forth in full.

The embodiments of the present invention also address the issue of associativity between POP messaging and item location in the store.

Figure 13:
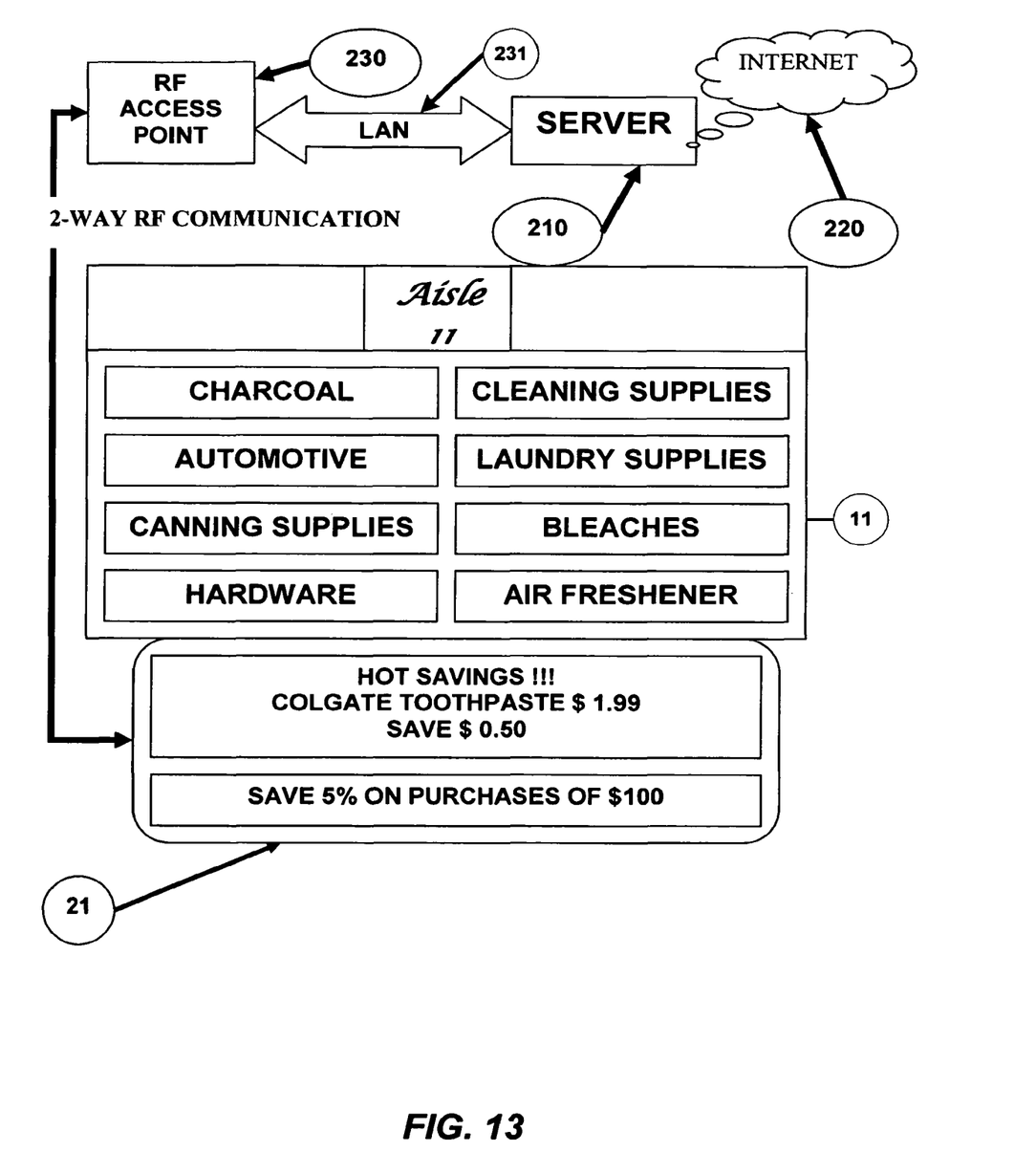
FIG. 13 shows an AISLE FRONTPAGE hanging from an AISLE DIRECTORY 21.

Referring to FIG. 13, the AISLE FRONTPAGE 21 can hang under the Aisle Directory 11 and presents dynamic messages that are sent to it via a wireless link from a centralized content server. That is, electronic messages are dynamically, in real-time, displayed to customers of a retail outlet, conveying various kinds of information being promoted. In this manner, an in-store messaging via electronic display is effectuated.

Referring still to FIG. 13, one embodiment of the present invention calls for electronic signage, referred to herein as the AISLE FRONTPAGE 21, that can hang under the Aisle Directory 10 and presents dynamic messages to the customers directing them to promotions in the aisle for that particular instance of day and time.

In FIG. 13, a radio frequency (RF) access point 230 coupled through a local area network 231 to a server 210. The server (or store central computer) 210 is also shown to communicate through the Internet (or retail headquarter) 220. The store central computer 210 stores the information that is ultimately displayed as messages to users or customers. That is, the dynamic messaging on the AISLE FRONTPAGE 20 can be delivered via a wired or a wireless solution under direct control of a store central computer 210 that may optionally be receiving messaging from a central computer at the retail headquarter 220. In addition, the messaging directed to the AISLE FRONTPAGE 21 is designed to be context specific for an aisle using the store central computer resident controlling software that is aware of the physical location of the AISLE FRONTPAGE 21 and its association with the contents of the particular aisle.

Figure 14:
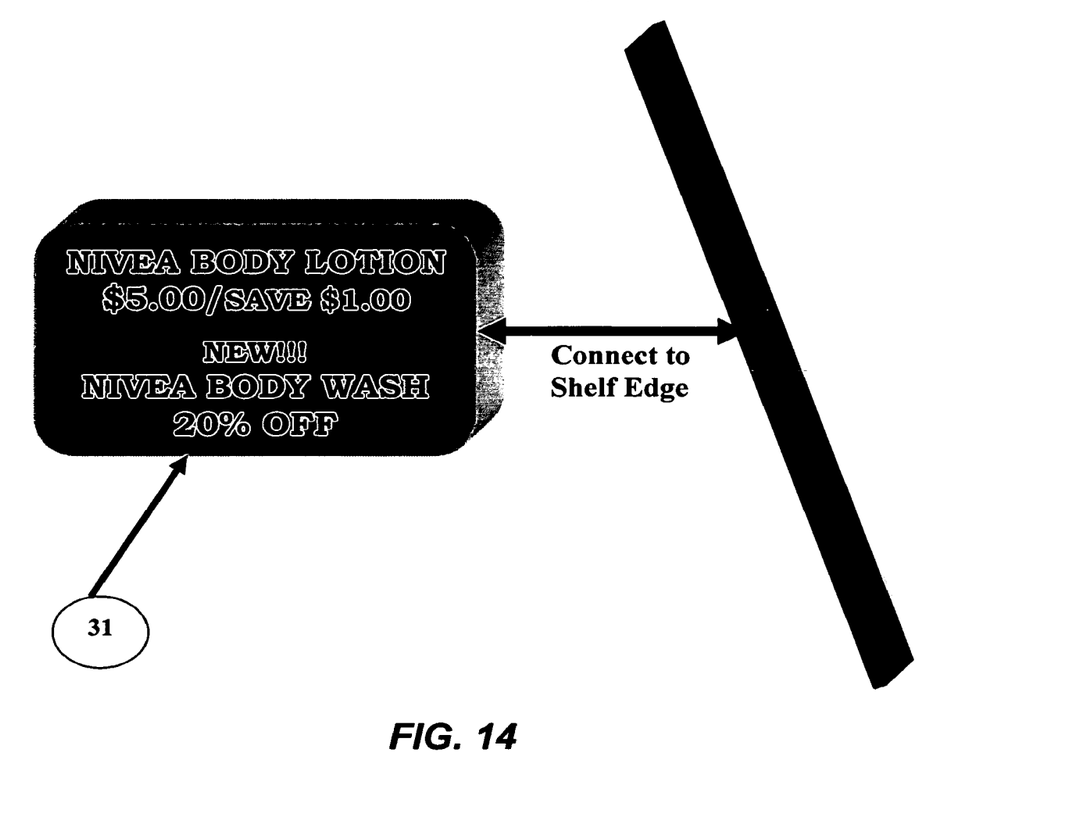
FIG. 14 shows an AISLE INTERRUPTOR 31 at the shelf edge.

The preferred embodiment of the AISLE FRONTPAGE as shown in FIG. 13 is an autonomously powered device that can be in RF communication with a central RF Network 230 such that it may be autonomously placed in any part of the store without the need for power or data wiring. Alternative embodiments to RF are infra-red (IR), any other optical communications (LED-based, laser/laser-diode based, fluorescent lights, tungsten lights, and so forth), electro-magnetically-coupled-capacitively-coupled, and inductively-coupled. Embodiments of AISLE FRONTPAGE requiring displays with higher power requirements may also be wired for power. Referring to FIG. 14, another embodiment of the present invention prescribes the placement of the AISLE FRONTPAGE device at the aisle's shelving level—possibly perpendicular to the shelve edges. This embodiment of the invention is referred to herein as the AISLE INTERRUPTOR 31.

Referring still to FIG. 14, another embodiment of the present invention prescribes the placement of the AISLE FRONTPAGE device at the aisle's shelving level—possibly perpendicular to the shelve edges. In this variation, the present invention is referred to as an AISLE INTERRUPTOR 31 and presents dynamic messaging that is aisle-section-specific, to the customers.

Referring again to FIG. 15, a free-standing embodiment of the present invention is called THE IRONMAN 41.

Figure 15:
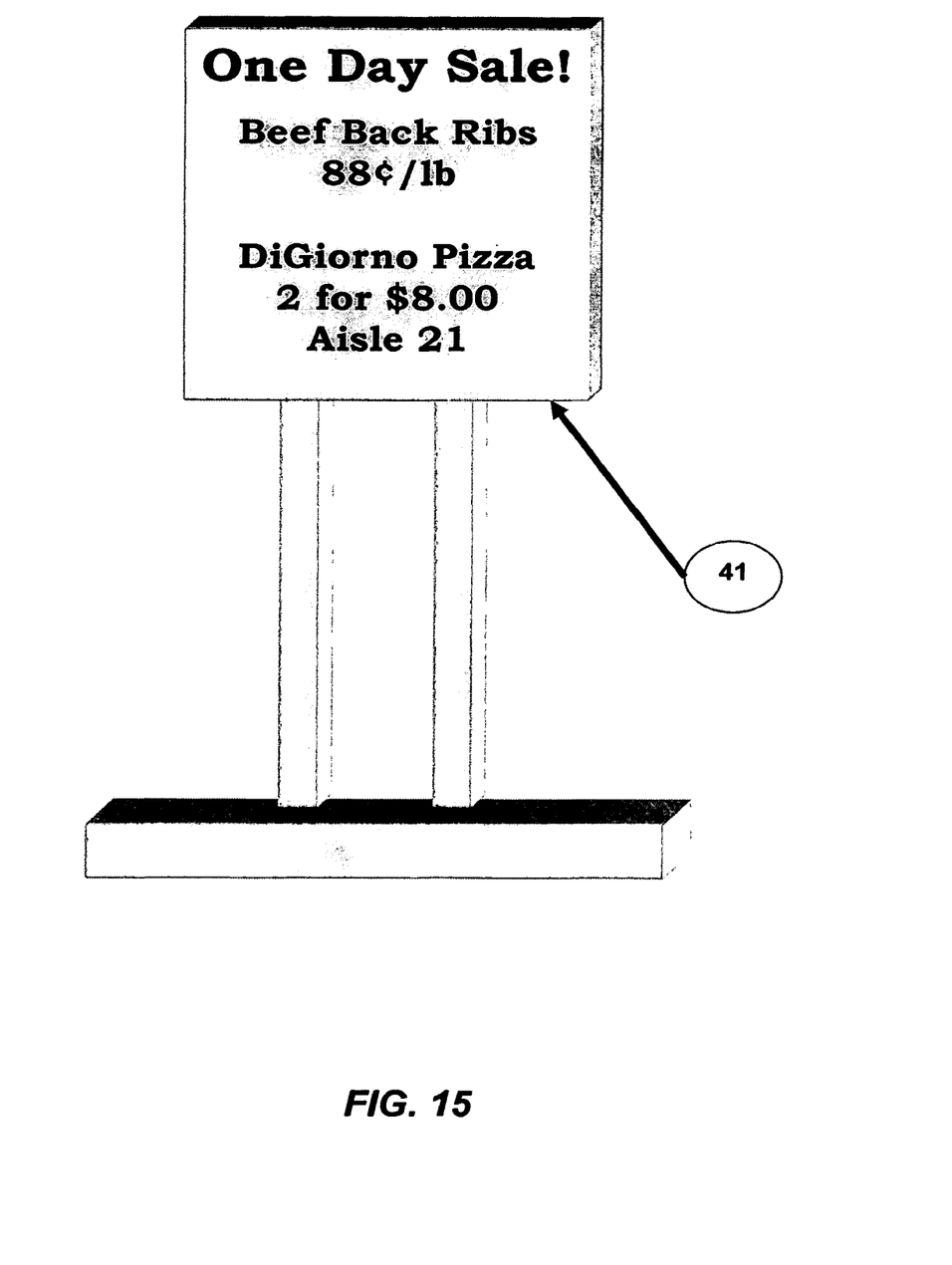
FIG. 15 shows THE IRONMAN embodiments of the present invention 41.
Figure 16:
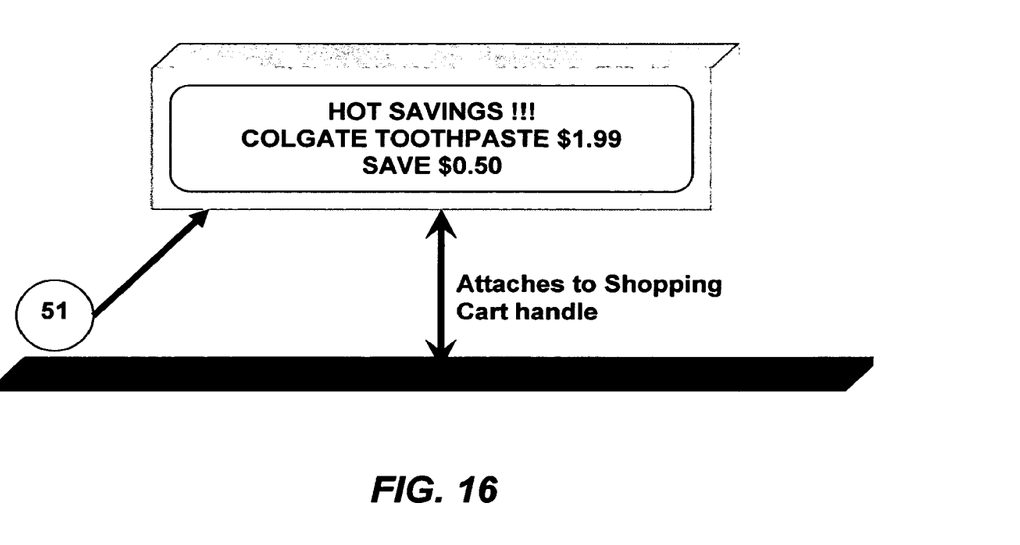
FIG. 16 shows an embodiment of the present invention as a CART DISPLAY 51.

Referring still to FIG. 15, another embodiment of the present invention may be placed in various locations in a store as a free standing floor display. In this variation, the present invention is referred to as THE IRONMAN 41 and presents dynamic messaging regarding a group of merchandise arranged around itself at the floor level. Referring now to FIG. 16, a cart mounted embodiment 15 of the present invention is called the CART DISPLAY 51.

In addition to the above fixed location embodiments, real-time, location and context-sensitive POP messaging can also be delivered to shopping-cart mounted displays. As shown in FIG. 16, this embodiment is referred to herein as the CART DISPLAY 51. In this manner, the user of the shopping cart to which POP messages are being displayed on the cart's CART DISPLAY 15, is informed, in real-time, of current pricing, location, specials, promotions and other information related to the products for sale or otherwise in a retail or grocery outlet.

Figure 17:
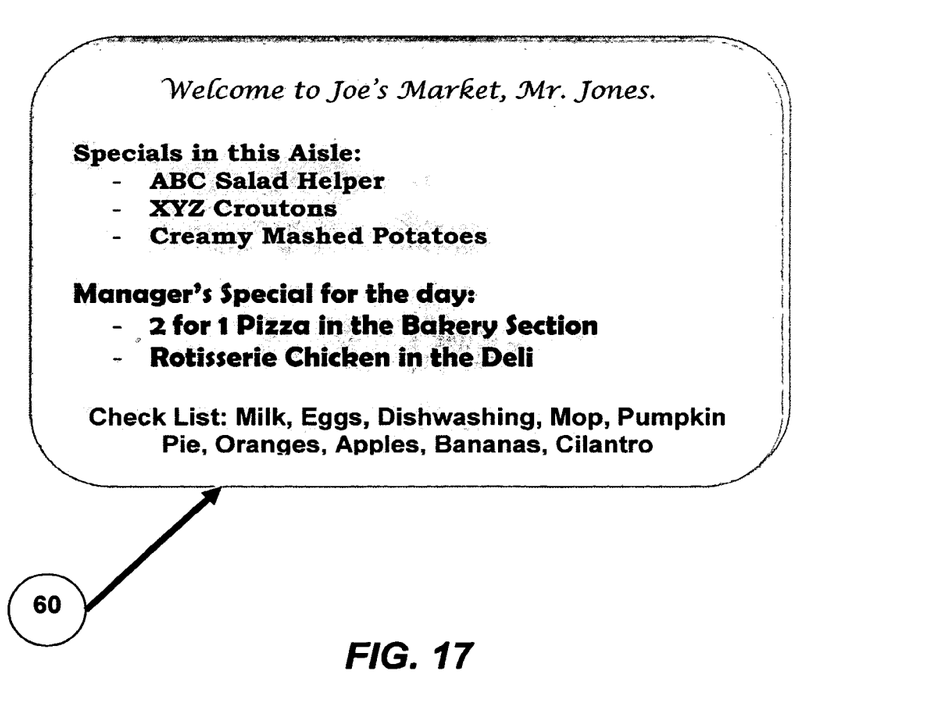
FIG. 17 shows an embodiment of the present invention as a SMART DISPLAY CARD 60.

Referring now to FIG. 17, an embodiment of the present invention with a form factor similar to a credit card, but with a built-in screen display, is called the SMART DISPLAY CARD 60.

FIG. 17 shows another variation of the embodiment of FIG. 16. In this embodiment, the POP messaging system has a form factor similar to a credit card with a display screen built in and can be carried on the person of an individual.

One of the significant difference of all the POP messaging embodiments disclosed herein and the existing art is that these embodiments can be communicated with over relatively long ranges, can be located accurately spatially while static or traveling within an RF network, can have built-in displays, and in the case of SMART DISPLAY CARD, can be queried for identification and due to all of the above-mentioned characteristics, can be sent location and context specific messaging individualized for the particular POP device or for the carrier of the SMART DISPLAY CARD.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

The invention claimed is:

1. A device, comprising:
a remotely programmable electronic shelf label (ESL) having a power source, the ESL being located in close proximity to an item for sale in a retail outlet;
an electronic remotely programmable bib tag unit flexibly connected to the ESL and detachable from the ESL, the programmable bib tag unit having a separate power source from the ESL, one or more light emitting devices (LEDs) each exhibiting a state and/or color and located on the face of the programmable bit tag unit, the states and/or colors thereof being indicative of information significant to a potential customer or store personnel, the one or more LEDs having a color assigned to customer messaging and a color assigned to store operations.

2. The device of claim 1, wherein the remotely programmable electronic shelf label (ESL) has a "glow-bar" including the one or more LEDs and being coupled to a fluorescent element mounted on the ESL such that the fluorescent element acts as an enhancement for the one or more LEDs' light source.

3. The device of claim 2, wherein the information is promotional.

4. The device of claim 2, wherein the one or more LEDs and the "glow-bar" are indicative of independent promotions.

5. The device of claim 1, wherein the remotely programmable electronic shelf label (ESL) further includes a screen display element for displaying the information in reverse field.

6. The device of claim 5, wherein the information is sale pricing.

7. The device of claim 1, wherein the remotely programmable electronic shelf label (ESL) further includes a segmented display element.

8. The device of claim 1, wherein the remotely programmable electronic shelf label (ESL) further includes a dot-matrix display element partitioned to show different kinds of information.

9. The device of claim 8, wherein the remotely programmable electronic shelf label (ESL) display element is programmable.

10. The device of claim 1, wherein the PBT includes glow-bar indicative of information associated with an item being promoted.

* * * * *